United States Patent [19]

Hitch

[11] 3,755,221

[45] Aug. 28, 1973

[54] FAST CYCLING POLYAMIDE MOLDING COMPOSITION WHICH CONTAINS A PARTICULATE NUCLEATING AGENT, AN ALKYLENE DIAMIDE, AND A METAL SALT OF A MONOCARBOXYLIC ACID

[75] Inventor: Michael John Hitch, Welwyn Garden, England

[73] Assignee: Imperial Chemical Industries Limited, London, England

[22] Filed: Dec. 30, 1971

[21] Appl. No.: 214,415

[30] Foreign Application Priority Data
Jan. 18, 1971 Great Britain..................... 2,277/71
Apr. 15, 1971 Great Britain..................... 9,492/71

[52] U.S. Cl......... 260/18 N, 260/32.6 N, 260/37 N, 260/78 A, 260/78 S, 260/857 L, 264/300
[51] Int. Cl............................................. C08g 20/12
[58] Field of Search................... 260/18 N, 32.6 N, 260/37 N, 78 A, 857 L, 78 S; 264/300

[56] References Cited
UNITED STATES PATENTS

| 3,471,426 | 10/1969 | Hofton | 260/32.6 |
|---|---|---|---|
| 3,342,762 | 9/1967 | Crovatt, Jr. | 260/32.6 |
| 3,549,651 | 12/1970 | Oswald et al. | 260/32.6 |
| 3,400,087 | 9/1968 | Robb et al. | 260/18 |
| 2,948,698 | 8/1960 | Cocci | 260/32.6 |
| 3,661,837 | 5/1972 | Cadus et al. | 260/37 |
| 3,164,563 | 1/1965 | Maxwell et al. | 260/37 |
| 3,418,267 | 12/1968 | Busse | 260/37 |
| 3,516,961 | 6/1970 | Robb | 260/37 |
| 3,080,345 | 3/1963 | Brooks et al. | 260/78 |
| 3,585,264 | 6/1971 | Thomas | 260/78 |

FOREIGN PATENTS OR APPLICATIONS

| 1,240,996 | 7/1971 | Great Britain | 260/78 |
|---|---|---|---|
| 851,300 | 10/1960 | Great Britain | 260/78 |
| 998,439 | 7/1965 | Great Britain | 260/78 |

*Primary Examiner*—Donald E. Czaja
*Assistant Examiner*—Eugene C. Rzucidlo
*Attorney*—Cushman, Darby & Cushman

[57] ABSTRACT

A fast-cycling polyhexamethylene adipamide composition containing from 0.001 to 0.5 per cent by weight of an inert nucleant, from 0.01 to 4 per cent by weight of a specified alkylene diamide, and from 0.01 to 2 per cent by weight of a specified metal carboxylate.

14 Claims, No Drawings

FAST CYCLING POLYAMIDE MOLDING COMPOSITION WHICH CONTAINS A PARTICULATE NUCLEATING AGENT, AN ALKYLENE DIAMIDE, AND A METAL SALT OF A MONOCARBOXYLIC ACID

The present invention relates to thermoplastic polyamide compositions and in particular to fast-cycling polyamide compositions by which is meant compositions which are suitable for moulding at a rapid rate. The invention also relates to articles moulded from such compositions and to a moulding process for producing such articles.

Polyamides are normally processed by extrusion or injection moulding techniques, the latter being one of the main methods of fabricating discrete articles from polyamides. The injection moulding process consists essentially of softening the thermoplastic material in a heated cylinder, injecting it while molten under high pressure into a closed mould, cooling the mould to induce solidification, and ejecting the moulded article from the mould.

With a crystalline material like a polyamide, solidication in the mould to give a useful article is dependent on the crystallisation of the material, and it has been proposed to prepare substantially stress-free moulded articles from a crystallisable plastics material by nucleating a melt of the plastics material with a small amount of a very finely and substantially uniformly divided salt of a saturated or unsaturated higher fatty acid. It has also been proposed to control the structural properties of polycaprolactam by polymerising monomeric caprolactam to which has been added an aqueous emulsion of a silicone oil or resin containing a precipitated inorganic salt, such as calcium fluoride.

The sequential operations involved in forming an article by injection moulding constitute an injection cycle, and, particularly where large numbers of moulded articles are to be fabricated by repetition of the injection cycle, it is desirable that the cycle time should be reduced to a minimum. Rate-controlling steps in the injection cycle are the time taken for the molten polyamide to flow into the mould, and the time for which the filled mould remains closed until the polyamide is sufficiently solidified to be removed from the mould without suffering deformation or other damage. By using a polyamide composition containing polyhexamethylene adipamide and a particular combination of additives, it has now been found that the length of these rate- controlling steps and therefore of the total cycle time can be reduced to considerably less than the cycle time for the same polyamide without the additives.

Accordingly, the present invention provides a fast-cycling polyamide composition comprising polyhexamethylene adipamide containing, by weight of the polyhexamethylene adipamide, i. from 0.001 to 0.5 per cent of an inert particulate nucleating agent having an average diameter of less than 0.5 micron,
  ii. from 0.01 to 4 per cent of an alkylene diamide derived from an alkylene diamine of formula $H_2N(CH_2)_nNH_2$, wherein $n$ is an integer of from 1 to 16, and a saturated or unsaturated monocarboxylic acid containing from 12 to 20 carbon atoms, and
  iii. from 0.01 to 2 per cent of a metal salt of a saturated or unsaturated monocarboxylic acid containing from 12 to 20 carbon atoms.

The polyhexamethylene adipamide may be prepared by conventional techniques, for example by polymerising substantially equimolecular proportions of a adipic acid and hexamethylene diamine. The adipic acid may be used in the form of a functional derivative thereof, for example an ester, or halide.

The term "substantially equimolecular proportions" is used to cover both strict equimolecular proportions and the slight departures therefrom which are involved in conventional techniques for stabilising the viscosity of the resultant polyamide.

If desired, a portion of the polyhexamethylene adipamide may be replaced by an ethylene copolymer containing pendent polar groups along the polymer chain. Thus, up to 50% weight by weight of the polyhexamethylene adipamide may be replaced by a copolymer of ethylene with a hydroxy- or epoxy-ester of an $\alpha,\beta$-unsaturated carboxylic acid of the kind disclosed in the complete specification of British Pat. No. 1,241,361 — an ethylene/hydroxyethyl methacrylate copolymer being particularly suitable, by a copolymer of ethylene with an amino-ester of an $\alpha,\beta$-unsaturated carboxylic acid of the kind disclosed in the complete specification of British Pat. No. 1,284,489, or by an olefin copolymer containing free acid groups of the kind disclosed in the complete specification of British Pat. No. 998,439.

By a nucleating agent is meant an inert solid substance in the form of particles having a diameter of less than 0.5 micron which, when present in the molten moulding composition of this invention, induces, in the polyhexamethylene adipamide the formation and growth of a crystalline texture characterised by a reduction both in sphurulitic size and in the degree of supercooling exhibited by the molten composition on cooling.

Any of the nucleating agents conventionally used in the production of polyamides having a fine crystalline structure is suitable for use in the compositions of the present invention. Thus, the nucleating agent may be a polymeric organic material having a melting point in excess of that of the polyamide in the composition. Especially useful organic nucleating agents are polyamides or copolyamides containing an aryl group in the polymer chain as described in the complete specification of our British Pat. No. 1,126,213. Alternatively, and preferably, the nucleating agent may be an inorganic material, for example a silicate such as talc, molybdenum disulphide, graphite or an alkali- or alkaline earth-metal fluoride. Potassium fluoride may be employed, and we have found that calcium fluoride is particularly suitable as a nucleating agent.

The nucleating agents are required to be in a finely divided state — that is, having an average diameter of less than 0.5 micron. Preferably the average diameter should be less than 0.1 micron, and a calcium fluoride nucleating agent having an average diameter in the range of from 0.08 to 0.015 micron is particularly preferred.

Although effective nucleation of the polyhexamethylene adipamide may be obtained by use of as little as 0.001 per cent by weight of the nucleating agent, based on the weight of the polyhexamethylene adipamide, it is preferred that from about 0.02 to 0.2 per cent by weight should be employed to ensure effective nucleation of the polymer. In practice, 0.1 per cent by weight of nucleating agent is perfectly satisfactory.

The nucleating agent is incorporated into the polyhexamethylene adipamide in any convenient manner. For example, an aqueous calcium fluoride slurry may be introduced into the autoclave in which polymerisation of the polyamide-forming salt is effected or into the polymerisation coil of a continuous polymerisation system as described for example in the complete specifications of our British Pat. Nos. 924,630; 1,030,344; 1,085,816; 1,143,258; and 1,159,151. If desired the nucleating agent may be prepared in situ in the autoclave or coil. For example calcium fluoride nucleant may be prepared by reacting calcium adipate and hexamethylene diammonium dihydrofluoride, the by-products from this reaction being water and polyamide salt. Alternatively, dry particulate nucleating agent may be blended with preformed polyhexamethylene adipamide, for example by tumbling the dry components together, and then extruding the mixture through a heated extruder to effect melt-dispersion of the nucleating agent in the polyhexamethylene adipamide.

The presence of a nucleating agent in the polyhexamethylene adipamide compositions of the invention resuslts in the solidification of articles moulded therefrom at a higher temperature than would otherwise be the case. The time for which the mould must remain closed can therefore be reduced and the rate of production of moulded articles correspondingly increased.

The diamides suitable for use in the present invention may be prepared by reacting an alkylene diamine with a saturated or unsaturated monocarboxylic acid. The number of carbon atoms in the diamine is in the range from one to 16, and suitable diamines include propylenediamine, butylenediamine, pentamethylenediamine, hexamethylenediamine and higher homologues. Diamides of ethylenediamine have been found to be particularly suitable.

Monocarboxylic acids suitable for use in the preparation of the alkylenediamides include lauric, myristic, palmitic, stearic, arachidic, palmitoleic, oleic, ricinoleic, linoleic, petroselenic and gadoleic acids.

The preferred diamide is N,N'-ethylene-bis-stearamide.

The alkylene diamide is believed to serve as a mould-release agent to prevent adhesion of the moulded article to the walls of the mould in which the article is formed and to facilitate removal of the article from the mould. This function is performed efficiently when the diamide is present in the compositions of the present invention in quantities in the range of 0.01 to 4% by weight, based on the weight of the polyamide. Little advantage is observed when the quantity exceeds 4% Suitably, the quantity of diamide employed may be from 0.1 to 1.0% by weight, and, in practice, it is found that satisfactory mould-release proporties are usually conferred when 0.2% by weight of the diamide is employed.

The alkylene diamide is incorporated into the polyhexamethylene adipamide in any convenient manner, with the proviso that it should not be added in circumstances such that hydrolysis of the diamide to form free carboxylic acid is likely to take place. Thus, if the diamide is to be introduced into the polymerisation autoclave or into the polymerisation coil of a continuous polymerisation system, the addition should be effected at a late stage in the reaction when the polymerisation mass is virtually free from water. The diamide may be dissolved in a suitable solvent — for example an alcoholic or ketonic solvent, such as methanol or acetone, for addition to the polyhexamethylene adipamide, but is most conveniently incorporated by dusting the polymer with dry, particulate diamide, for example by tumbling the components together. Subsequent melt extrusion of the dry blend is normally effective in providing a substantially uniform and homogeneous product.

Suitable metal carboxylates for incorporation into the compositions of this invention are those of saturated or unsaturated monocarboxylic acids containing from 12 to 20 carbon atoms with any suitable metal — for example alkali metals such as lithium, sodium or potassium, alkaline earth metals such as magnesium, calcium, strontium or barium, or lead, aluminium, zinc or cadmium. Transition metals (forming coloured salts) are less desirable. Suitable acids are those hereinbefore discussed in relation to the mould-release agent.

The preferred metal carboxylate is zinc stearate.

The metal carboxylate serves as a lubricant to facilitate flow of the molten polyhexamethylene adipamide composition into the mould and is suitably employed in quantities of from 0.01 to 2% by weight of the polyhexamethylene adipamide. Preferably, the quantity employed is from 0.1 to 1.0% by weight, and, in practice, 0.3% by weight is usually very effective.

The metal carboxylate is incorporated into the polyhexamethylene adipamide in any convenient manner, and will normally be dry-blended with the polymer, and the resultant blend melt-extruded to produce a substantially homogeneous moulding material.

Each, or any one, of the additives incorporated into the polyhexamethylene adipamide compositions of this invention may consist of a mixture of substances provided each of such substances is within the prescribed definition and the specified content of additives in the compositions is not exceeded. For example, the lubricant may comprise a mixture of zinc stearate and calcium oleate.

In addition to the specified additives, the compositions of the present invention may also contain any of the other additives conventionally employed in polyamides, such as pigments, fillers, delustering agents, anti-oxidants and thermal stabilisers. In particular, the polyhexamethylene adipamide may contain a reinforcing agent — for example glass fibres — which may be present is an amount up to about 60% by weight of the polymer. Flame-retardant agents may also be present, for example those disclosed in the complete specification of our British Pat. No. 1,208,865.

According to another aspect of the invention there is provided an article moulded from a polyhexamethylene adipamide composition as hereinbefore described.

According to a still further aspect of the invention there is provided a method of producing a moulded article by means of a fast cycle which comprises a. melting a polyhexamethylene adipamide composition as hereinbefore described, b. injecting a charge of the molten composition into a mould, and c. cooling the mould, or allowing it to cool, to solidify the charge of material in the mould.

The compositions of the present invention are also suitable for melt extrusion by conventional technqiues to form a film or filament which crystallises at a higher temperature than would a film or filament derived from virgin polyamide. By virtue of the reduced spherulitic size, the film or filament exhibits improved clarity, and the presence of the diamide and carboxylate derivatives enhances its slip properties.

The invention is illustrated by reference to the following examples, in which "EBS" refers to N,N'-ethylene-bis-stearamide and "ZnSt" refers to zinc stearate.

EXAMPLE 1

Nucleated polyhexamethylene adipamide was prepared by polymerisation of an aqueous solution of nylon salt in a stainless steel autoclave (capacity 682 dm$^3$) and injecting into the autoclave over a period of about 30 minutes sufficient of a 4% aqueous slurry of calcium fluoride (Number Average Particle size 0.03 micron) to yield a polymer containing 0.1% by weight of calcium fluoride. During the injection the autoclave was maintained at a temperature of 498K and a gauge pressure of $17.236 \times 10^5$ Nm$^{-2}$.

Nucleated polyamide (Inherent Viscosity 1.0; measured as a 0.5 wt % solution in 90% formic acid at 298K) recovered from the autoclave was cut into chips which were tumble blended with 0.2% by weight of ethylene bis-stearamide and 0.3% by weight of zinc stearate, and the blend was melt extruded to produce a homogeneous product which was mechanically cut into the form of cylindrical moulding granules.

A series of mouldings was produced from these moulding granules on each of a number of injection moulding machines and the cycle time determined for each machine, the cycle time being regarded as the time interval elapsing between injection of successive mouldings from the mould of a given machine. For comparison purposes a similar series of mouldings was produced from polyhexamethylene adipamide containing a variety of additives and the results are set out in the accompanying Table.

compositions of varying calcium fluoride content, each containing 0.2% by weight of ethylene bis-stearamide and 0.3% by weight of zinc stearate.

The crystallisation behaviour of each composition was examined by Differential Scanning Calorimetry techniques employing a cooling rate of 289K/minute, and the results are shown in the following Table.

TABLE

| Additive, percent by weight of polyamide | | | Crystallisation temperature, °C. | |
|---|---|---|---|---|
| CaF$_2$ | EBS | ZnSt | At start of crystallisation | At which maximum crystallinity observed |
| 0.1 | 0.2 | 0.3 | 245.5 | 236.0 |
| 0.05 | 0.2 | 0.3 | 245.0 | 233.0 |
| 0.02 | 0.2 | 0.3 | 243.5 | 232.5 |
| 0.01 | 0.2 | 0.3 | 241.0 | 232.0 |
| 0.005 | 0.2 | 0.3 | 237.5 | 229.5 |
| 0 | 0.2 | 0.3 | 233.5 | 225.5 |

These results demonstrate that crystallisation is both initiated and completed at a significantly higher temperature in the compositions of this invention than in unnucleated polyamides, so that articles moulded from the new compositions can be removed from their moulds after a shorter cooling time than that required for the moulding of unnucleated polyamides.

The fast-cycling properties of each of the compositions was studied by employing a Stubbe SKM51-S injection moulding machine operating at an injection pressure of 140 kg/cm$^2$ and screw speed of 520 rpm to fill a six-piece strap mould. The times required to fill the mould (Injection time), to cool the mould to a temperature at which the moulding could be removed from the mould without sustaining damage (Cooling time), and to open the mould, remove the moulding, and re-close the mould (Interval time), were measured for each composition and are recorded in the following Table.

TABLE

| Polyamide | Polyhexamethylene adipamide | | | | |
|---|---|---|---|---|---|
| Additive | [1] 0.1 | [1] 0.1 | [1] 0.1 | [1] 0.1 | Nil |
| Percent by weight of polyamide (this invention) | [2] 0.2 | [3] 0.5 | [4] 0.3 | [4] 0.42 | |
| | [3] 0.3 | | [5] 0.2 | [5] 0.28 | |

| | Cycle time, seconds | | | | |
|---|---|---|---|---|---|
| Injection moulding machine: | | | | | |
| BIPEL (0.028 kg. capacity)-24 impression tool | 5 | 12 | | | 14 |
| Stubbe SKM51-8 impression tool | 8 | | 10 | 13 | |
| Stubbe SKM141-24 impression tool | 5.5 | | | 9 | 15 |
| Husky 150P-32 impression tool | 5.0 | 6 | 5.6 | 7.2 | |

[1] CaF$_2$.
[2] EBS.
[3] ZnSt.
[4] Stearic acid.
[5] Palmitic acid.

From the data in the Table, the reduction in cycle time achieved by use of the compositions of the present invention is clearly demonstrated. The absence of an entry for cycle time indicates that no determination was made.

EXAMPLE 2

Polyhexamethylene adipamide nucleated with 0.1% by weight of calcium fluoride was prepared as described in Example 1, and samples of this nucleated material were extrusion compounded with unnucleated polyhexamethylene-adipamide, ethylene bis-stearamide and zinc stearate to produce a series of

TABLE

| Additive, percent by weight of polyamide | | | Injection time, seconds | Cooling time, seconds | Interval time, seconds | Total cycle, seconds |
|---|---|---|---|---|---|---|
| CaF$_2$ | EBS | ZnSt | | | | |
| 0.1 | 0.2 | 0.3 | 0.6 | 1.0 | 1.0 | 2.6 |
| 0.05 | 0.2 | 0.3 | 0.6 | 1.0 | 1.0 | 2.6 |
| 0.02 | 0.2 | 0.3 | 0.6 | 1.0 | 1.0 | 2.6 |
| 0.01 | 0.2 | 0.3 | 0.6 | 1.0 | 1.0 | 2.6 |
| 0.005 | 0.2 | 0.3 | 0.6 | 1.0 | 1.0 | 2.6 |
| 0 | 0.2 | 0.3 | 0.6 | 2.0 | 1.0 | 3.6 |

The above results show that the cycle time for producing mouldings from the polyamide compositions of this invention is approximately 72% of that for unnucleated polyamides.

EXAMPLE 3

Portions of polyhexamethylene adipamide chips (Inherent Viscosity 1.0; measured as a 0.5 wt % solution in 90% formic acid at 298K) were tumble blended with appropriate quantities of ethylene-bis-stearamide, zinc stearate and a variety of nucleating agents, and each blend was melt extruded to produce a homogeneous product containing 0.2% by weight of ethylene-bis-stearamide, 0.3% by weight of zinc stearate, and 0.2% by weight of nucleating agent.

The extrudate was mechanically cut to the form of cylindrical moulding granules from which injection mouldings were produced on a Stubble SKM 51-S injection moulding machine operating at an injection pressure of 30 kg/cm$^2$ and employing an injection time of 1.2 seconds.

The mould employed was a disc mould with a square-sectioned axial insert to form a disc moulding some 30 mm in diameter and 5 mm in thickness having a square axial recess therein of side 10 mm and depth 4 mm. The time, in seconds, required to cool the mould to a temperature at which the disc could be removed from the mould without molten polymer exuding through the wall of the moulding into the axial recess was recorded as the Cooling Time.

The calcium fluoride had a Number Average Particle Size of 0.03 micron, the particle size of the other nucleants being of the order of 0.05 micron.

Results are recorded in the following Table.

TABLE

| Nucleating Agent, 0.2% by wt. | EBS, percent by wt. | ZnSt, percent by wt. | Cooling time, seconds |
| --- | --- | --- | --- |
| Fumed Silica | 0.2 | 0.3 | 2.7 |
| Fumed Alumina | 0.2 | 0.3 | 4.0 |
| Molybdenum Disulphide | 0.2 | 0.3 | 2.4 |
| Talc | 0.2 | 0.3 | [1] 1.8 |
| Graphite | 0.2 | 0.3 | 2.5 |
| Calcium Fluoride | 0.2 | 0.3 | [1] 0.8 |
| Nil | 0.2 | 0.3 | [1] 7.0 |

[1] Mean of several determinations.

EXAMPLE 4

To demonstrate the effect of varying the quantity of alkylene diamide the procedure of Example 1 was repeated, i.e., calcium fluoride (Number Average Particle Size 0.03 micron) was added to the autoclave in the course of preparing the polyhexamethylene adipamide, and varying quantities of zinc stearate and ethylene-bis-stearamide were tumble blended into the resultant nucleated polyamide.

Disc mouldings were prepared on a Stubbe SKM 51-S injection moulding machine in accordance with the procedure of Example 3, the Cooling times determined being recorded in the following Table.

TABLE

| CaF$_2$, wt. percent | EBS, wt. percent | ZnSt, wt. percent | Cooling time, seconds |
| --- | --- | --- | --- |
| 0 | 0.2 | 0.3 | 7.0 |
| 0.05 | 0.1 | 0.3 | 1.8 |
| 0.05 | 1.0 | 0.3 | 2.0 |

The marginal increase in cooling time observed with the sample containing 1.0 wt % of ethylene-bis-stearamide is believed to result from the relatively high volatility of the additive which induces rupture of the outer skin of the moulding as the mould is cooled.

EXAMPLE 5

To demonstrate the effect of varying the quantity of metal carboxylate the procedure of Example 4 was repeated, and the results recorded in the following Table.

TABLE

| CaF$_2$, wt. percent | EBS, wt. percent | ZnSt, wt. percent | Cooling time, seconds |
| --- | --- | --- | --- |
| 0 | 0.2 | 0.3 | 7.0 |
| 0.05 | 0.2 | 0.1 | 2.5 |
| 0.05 | 0.2 | 1.0 | 1.9 |
| 0.1 | 0.2 | 2.0 | 1.8 |

EXAMPLE 6

To demonstrate the effect of alternative alkylene diamides, the procedure of Example 4 was repeated using hexamethylene-bis-stearamide (HMS) in place of ethylene-bis-stearamide. The results are recorded in the following Table.

TABLE

| CaF$_2$, wt. percent | EBS wt. percent | HMS wt. percent | ZnSt wt. percent | Cooling time, seconds |
| --- | --- | --- | --- | --- |
| 0.1 | 0.2 |  | 2.0 | 1.8 |
| 0.1 |  | 0.2 | 0.3 | 1.8 |

EXAMPLE 7

To demonstrate the effect of alternative carboxylic lubricants, the procedure of Example 4 was repeated using stearic acid and sodium oleate respectively in place of zinc stearate. The samples of polyhexamethylene adipamide were selected from a different batch to that employed in Examples 4, 5 and 6.

The results obtained were as follows:

| CaF$_2$, wt. percent | EBS, wt. percent | ZnSt, wt. percent | Sodium Oleate, wt. percent | Stearic Acid, wt. percent | Cooling time, seconds |
| --- | --- | --- | --- | --- | --- |
| 0.1 | 0.2 | 0.3 |  |  | 0.6 |
| 0.1 | 0.2 |  | 0.5 |  | 0.6 |
| 0.1 | 0.2 |  |  | 1.0 | 0.6 |

I claim:

1. A fast cycling polyamide molding composition comprising polyhexamethylene adipamide containing, by weight of the polyhexamethylene adipamide,
    i. from 0.001 to 0.5 per cent of an inert particulate nucleating agent having an average diameter of less than 0.5 micron, ii. from 0.01 to 4 per cent of an alkylene diamide derived from an alkylene diamine of formula $H_2N(CH_2)_nNH_2$, wherein $n$ is an integer of from 1 to 16, and a saturated or unsaturated monocarboxylic acid containing from 12 to 20 carbon atoms, and iii. from 0.01 to 2 per cent of a metal salt of a saturated or unsaturated monocarboxylic acid containing from 12 to 20 carbon atoms, said composition being characterized in that the injection molding thereof can be carried out in a shorter cycle than with the polyhexamethylene adipamide without said additives (*i*) – (*iii*).

2. A composition according to claim 1 in which the nucleating agent is present in an amount of from 0.02 to 0.2 per cent by weight of the polyhexamethylene adipamide.

3. A composition according to claim 1 in which the alkylene diamide is present in an amount of from 0.1 to 1.0 per cent by weight of the polyhexamethylene adipamide.

4. A composition according to claim 1 in which the metal carboxylate is present in an amount of from 0.1 to 1.0 per cent by weight of the polyhexamethylene adipamide.

5. A composition according to claim 1 in which the nucleating agent is calcium fluoride.

6. A composition according to claim 1 in which the alkylene diamide is N,N'-ethylene-bis-stearamide.

7. A composition according to claim 1 in which the metal carboxylate is zinc stearate.

8. A composition according to claim 1 in which the average particle diameter of the nucleating agent is less than 0.1 micron.

9. A composition according to claim 1 in which up to 50 per cent by weight of the polyhexamethylene adipamide is replaced by an ethylene copolymer containing pendent polar groups along the polymer chain.

10. A composition according to claim 1 in which the nucleating agent has been introduced into the reaction mixture from which the polyhexamethylene adipamide is formed by polymerisation.

11. A composition according to claim 1 into which is incorporated a pigment, filler, delustrant, antioxidant, thermal stabilizer, flame-retardant, or reinforcing agent.

12. A composition according to claim 11 in which the reinforcing agent comprises glass fibres.

13. An article formed from a composition according to claim 1.

14. A fast cycling polyamide composition according to claim 1 comprising polyhexamethylene adipamide containing, by weight of the polyhexamethylene adipamide, i. from 0.001 to 5 per cent of calcium fluoride having an average diameter of less than 0.5 micron, ii. from 0.01 to 4 per cent of N,N'-ethylene-bis-stearamide, and iii. from 0.01 to 2 per cent of zinc stearate.

* * * * *